Dec. 14, 1971     D. W. DANIEL     3,626,564
MANUFACTURE OF BEARING RACES
Filed Feb. 26, 1970     3 Sheets-Sheet 1
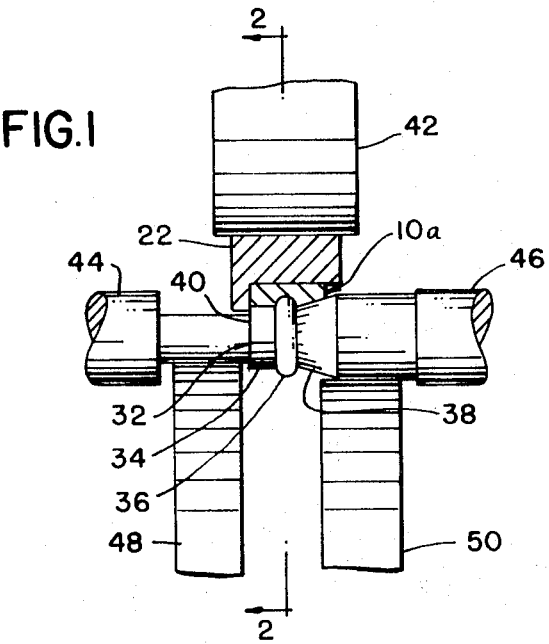
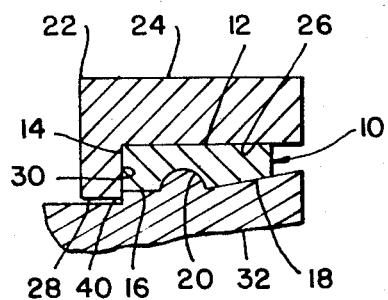
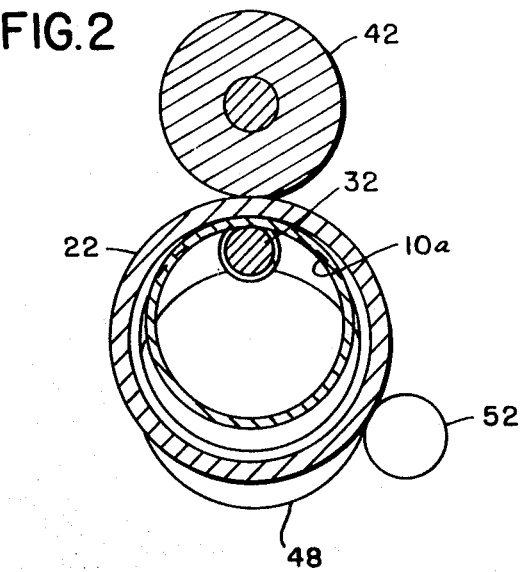
INVENTOR.
DAVID W. DANIEL
ATTORNEYS

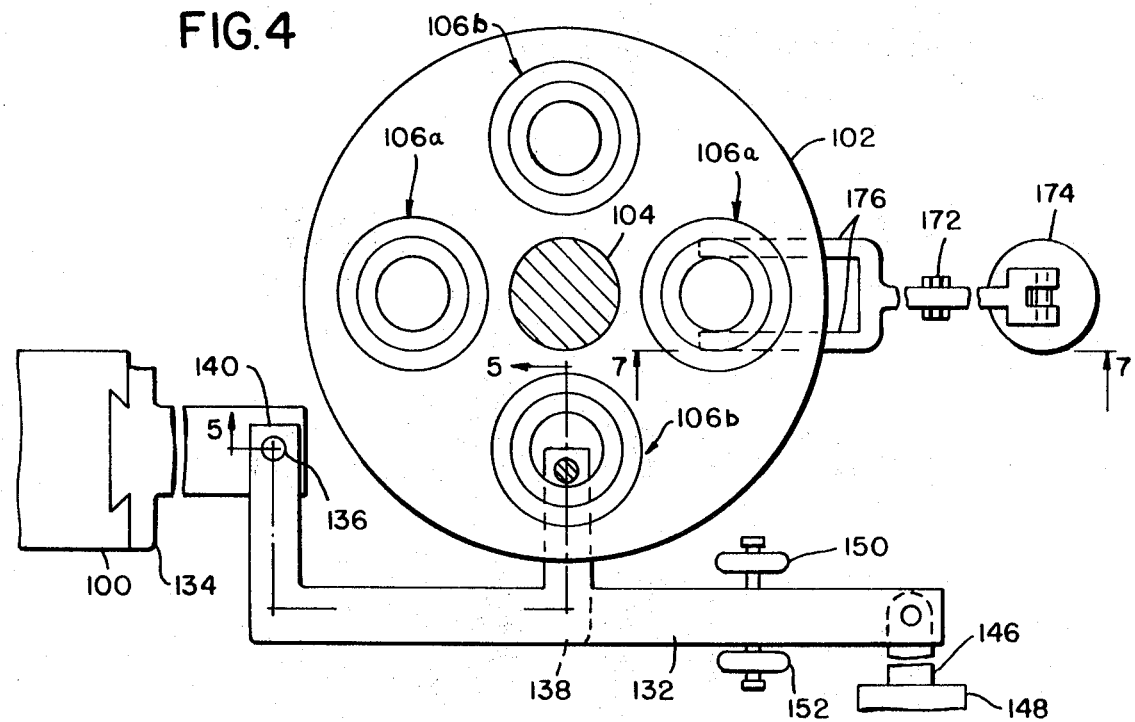
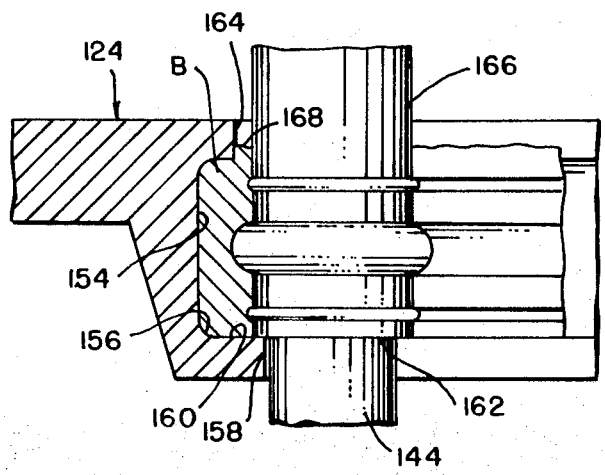

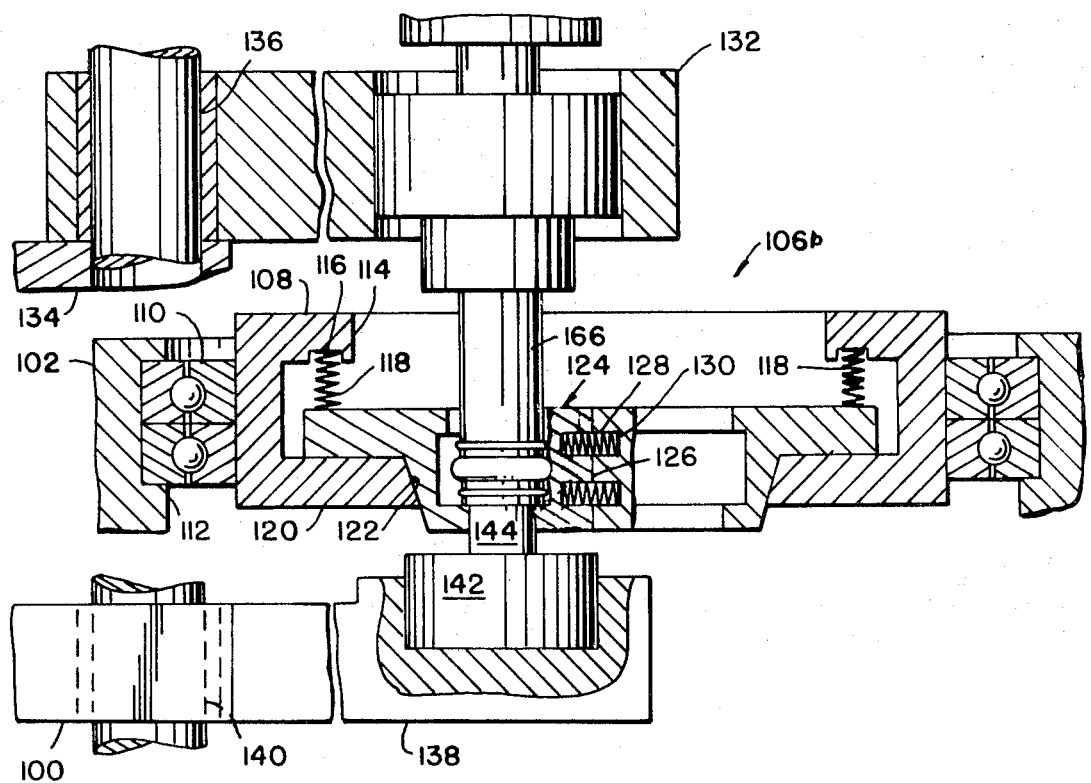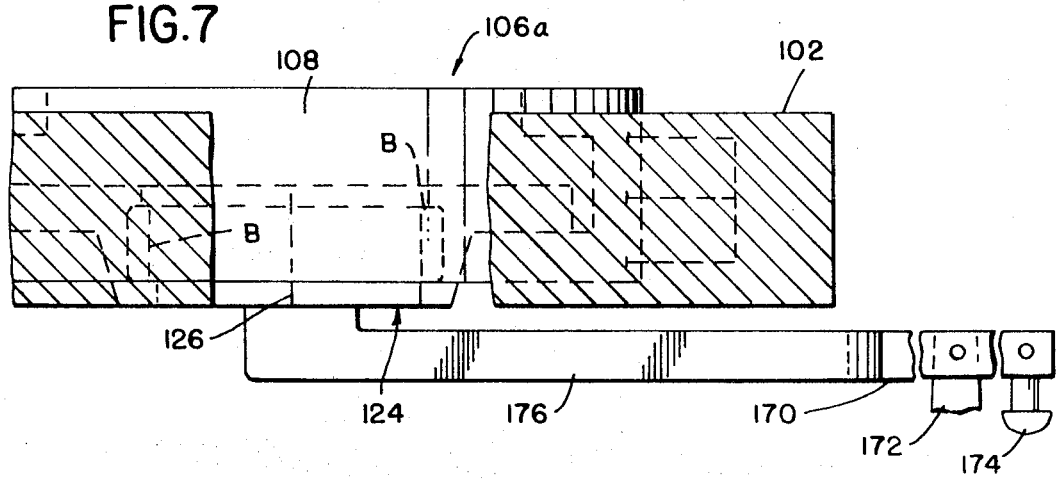

United States Patent Office 3,626,564
Patented Dec. 14, 1971

3,626,564
MANUFACTURE OF BEARING RACES
David W. Daniel, Birmingham, Mich., assignor to Lear Siegler, Inc., Santa Monica, Calif.
Filed Feb. 26, 1970, Ser. No. 14,483
Int. Cl. B21h 1/12
U.S. Cl. 29—148.4 R                     11 Claims

ABSTRACT OF THE DISCLOSURE

Internal ball bearing races are produced by rolling an annular body within a sizing ring to produce the required contour and dimensions.

BRIEF SUMMARY OF THE INVENTION

The present invention relates to the production of internal ball bearing races in which the inner surface of the race is provided with a generally arcuate cross-section circumferential channel.

The bearing race is produced from an annular body which is initially undersize. The annular body is rolled within a sizing ring by a small internal roll provided with an external rib shaped to produce the channel at the inner surface of the bearing race. As the rolling operation continues the radial dimension of the bearing race decreases with corresponding increase in its diameter until it completely fills the sizing ring. Thereafter, the excess stock is extruded axially at one side only of the race, the opposite side being restrained by a flange on the sizing ring.

With this arrangement the annular bodies may deliberately be provided with excess stock with assurance that the rolled bearing race will be accurate as to diameter and wall thickness and the only finishing operation which may be required is a removal of extruded stock from one side thereof.

BRIEF DESCRIPTION OF THE DRAWING

FIG. 1 is a fragmentary sectional view through the apparatus at the rolling zone.

FIG. 2 is a fragmentary sectional view on the line 2—2 of FIG. 1.

FIG. 3 is an enlarged view showing details of the rolling apparatus.

FIG. 4 is a fragmentary plan view of a second embodiment of the present invention.

FIG. 5 is an enlarged fragmentary elevational view, partly in section, on the line 5—5, of FIG. 4.

FIG. 6 is a further enlarged fragmentary sectional view of the line 5—5 of FIG. 4.

FIG. 7 is an enlarged fragmentary section on the line 7—7, FIG. 4.

DETAILED DESCRIPTION

Referring now to the drawings, the annular internal ball bearing race is indicated at 10, and in finished condition has a cylindrical exterior surface 12, a flat or planar side surface 14, an inner surface including a cylindrical portion 16, an inclined or conical portion 18, and a groove or channel 20 which is of generally semi-circular cross-section.

Critical dimensions of the bearing race 10 are of course its inner and outer diameters, and accordingly its wall thickness, as well as the shape and location of the ball-receiving groove or channel 20.

In order to produce the ball bearing race 10 an annular body designated 10a in FIGS. 1 and 2 is initially provided. This body has a diameter somewhat smaller than the required finished diameter of the bearing and it has a radial thickness somewhat greater than that desired in the finished product. It may be initially provided with smooth cylindrical inner and outer surfaces and flat end surfaces. The exact dimensions of the body are such as to provide a slight excess of material for a purpose which will presently appear.

In producing the finished bearing race the annular body 10a is initially positioned within a sizing ring 22. This ring, as best seen in FIG. 3, has a cylindrical exterior surface 23, a cylindrical inner surface 26, and a radially inwardly extending flange 28 presenting a flat surface 30.

As best seen in FIG. 2, the sizing ring 22 is appreciably larger than the annular body 10a and includes as a prime function the determination of the outside diameter of the bearing 10 which will of course be equal to the inside diameter of the ring 22 or the diameter of its internal cylindrical surface 26.

The assembly of the annular body 10a and the gauge or sizing ring 22 is mounted over a die 32 having a cylindrical surface 34, a circumferential rib or bead 36 conforming to the required cross-sectional shape of the groove or channel 20 to be provided in the bearing, and a generally conical surface 38. The die 32 is further provided with a flat radial shoulder 40 which in the rolling operation is engaged by the inner flat surface 30 on the flange 28 of the ring 22.

In order to support the sizing ring 22 and the die 32, an upper roller 42 is provided which engages the cylindrical surface 24 of the sizing ring 22 at its top. The die 32 is mounted for rotation between arbors 44 and 46 and the assembly is supported by rollers 48 and 50 which engage the arbors or die closely adjacent to the working zone.

In use the die 32 is driven in rotation which will cause the annular body 10a and the associated sizing ring 22 to rotate therewith. Pressure is applied to the bearing ring radially of the die by moving the die radially upwardly as seen in FIG. 1, or by moving the back-up roll 42 downwardly as the die is driven in rotation.

In order to support the sizing ring 22 and the annular body 10a against lateral movement during the rolling operation, a steadying guide roller 52 is preferably provided at the side thereof as determined by the direction of rotation of the die 32.

The result of the relative approach between the sizing ring 22 and the die 32 is to shape the inner surface of the annular body 10a to have the groove or channel 20 formed therein and to reduce its radial thickness. This has the result of increasing its diameter up to the point where its outside diameter becomes equal to the inside diameter of the sizing ring as determined by its internal cylindrical surface 26. At the same time, it will be observed that the flange 28 overlies the shoulder 40. Consequently, when the bearing race has been shaped to the cross-sectional shape as determined in FIG. 3 and has further been enlarged to the point where it conforms dimensionally with the sizing ring, further displacement of material occasioned by approach between the die 32 and the sizing ring 22 results in extrusion of the material of the annular body 10a to the right as indicated in FIG. 3, this extrusion being freely permitted since the material is completely unconfined at this point.

To insure that the bearing ring shall be completely formed and fully dimensioned, it is preferable to provide a slight excess of material over that actually required so that the finished rolled bearing includes some excess stock along its right side, as seen in FIG. 3. This excess material may of course be readily removed by a subsequent machining operation.

Referring now to FIGS. 4, 5, 6 and 7 there is illustrated a second embodiment of the present invention. As seen in these figures, there is provided a frame, a portion of which is indicated at 100 on which a rotary oscillatable or indexable platform 102 is provided. As illustrated in the figures, the platform 102 is a rotary table mounted for rotation on the frame 100 by rotary support means indicated at 104. On the table 102 there are provided a plurality of work supporting stations indicated generally at 106 and the stations in the position designated 106a are loading and unloading stations, and the stations designated generally 106b are operating stations.

Referring now to FIG. 5 there is shown in enlargement one of the operating stations 106b. This view is taken along the broken section line 5—5, to show the mounting for parts of the system. As seen in this figure, each station comprises a rotatable ring 108 shown as mounted in bearings 110 provided in an opening 112 in the table 102. The ring 108 includes an inwardly extending flange 114 recessed as indicated at 116 to receive compression springs 118. The ring 108 also includes an inwardly extending flange 120 which extends further inwardly than the flange 114 and which at its radially inner edge is conically tapered as indicated at 122 to form a locking angle with a two-piece sizing die or ring indicated generally at 124.

The sizing die or ring 124 is composed of two parts of semi-circular cross-section and the radially abutting edges 126 thereof are recessed as indicated at 128 to receive compression springs 130 urging the semi-circular die sections apart.

Referring again to FIG. 4, the rolling structure is carried by a swinging arm 132 carried by a vertically movable slide 134 to which the arm is pivoted as indicated at 136. The die structure also includes a lower swinging arm 138 pivoted to the frame 100 by pivot means 140 which are located directly below the pivot means 136. Suitable means (not shown) are provided for coupling the arms 132 and 138 together for simultaneously swinging movement while permitting vertical movement of the slide 134 and the arm 132 relative to the arm 138. With this arrangement the slide may be elevated to move the rolling die 144 out of the plug 142 and vertically to clear the upper end of the ring 108 to permit indexing of the table 102.

The arm 132 and the arm 138 to which it is coupled for swinging movement, are movable about the common axis of the pivot supports 136 and 140 by suitable means here indicated as a connecting rod 146 which connects the arm 132 to a suitable piston and cylinder device indicated at 148. Swinging movement of the arm 132 is limited by adjustable stops indicated at 150 and 152.

Referring now to FIG. 6, the two-piece sizing die 124 is provided at its inner surface with a recess 154 the corners of which are rounded as indicated at 156 to form the bearing B with rounded exterior corners as illustrated in the figure. The outer die construction includes an inwardly extending flange 158, the upper edge 160 being located to interfit closely with a shoulder 162 provided at a lower end of the bearing engaging portion of the rolling die 144 so as to insure the formation of a square cross-section corner at the lower edge of the bearing as seen in FIG. 6. At its upper edge the two-piece die structure includes an inwardly extending flange 164 which in use remains always spaced from the cylindrical portion 166 of the rolling die 144 so as to provide clearance for the axial extrusion of excess material of the bearing as indicated at 168.

At the loading station there is provided a lever 170 which is pivoted to a trunnion support 172 carried by the frame and movable by suitable power mechanism such as the piston and cylinder device indicated at 174. The lever 170 is provided with spaced arms 176 the ends of which are engageable with the underside of two halves of the die structure 124. At the loading and unloading station, the die structure including a finish-rolled bearing, comes to rest above the lever 170 which is then elevated to raise the sections out of the conical opening defining the locking surfaces 126. This action takes place against the compression springs 118 and permits the two halves of the bearing structure 124 to be separated to provide for removal of a finished bearing B. Upward movement of the die parts results in their separation by reason of the compression springs 130. With the die 144 clear of the bearing, the slide 134 is raised to cause the lower end of the rolling die 144 to retract from the plug 142 and move to a clearance position, preferably above the upper surface of the ring 108. At this time the finish-rolled bearing is removed and a blank placed in position to be supported by the lower flanges 160 of the outer die structure. The lever 170 is now operated to permit downward movement of the die sections 124 under the influence of the compression springs 118 into accurate sizing position in which the diametral surfaces 126 of the die structure abut, this movement taking place against the action of the compression springs 130.

The table 102 indexes to bring the bearing blank to the working station 106b at which time the slide 134 moves downwardly to cause the rolling die to move into the opening through the annular bearing blank. This movement is continued until the lower end of the rolling die moves into the plug 142 which supports it during the rolling operation. At this time the rolling die is urged to the left as seen in FIG. 6 by actuation of the piston and cylinder device 148, and shapes the bearing blank to the configuration illustrated in FIG. 6. The exterior surface of the bearing blank is shaped to conform to the recess provided in the die sections 124 and specifically, produces the cylindrical exterior surface illustrated in the figure and the smoothly rounded corners at the ends of this surface.

Since the bearing blank as initially provided in the apparatus is both oversize in radial thickness and undersize in diameter, the rolling operation both reduces the thickness of the bearing and at the same time increases its diameter. The increase in diameter of the bearing is of course limited by the dimensions of the two-piece die structure 124. Sufficient excess material is provided in the bearing blank to insure that when the bearing has been reduced to the required radial thickness, it will also have been increased in diameter to the dimensions determined by the inside diameter of the sizing die structure 124, and the excess material is caused to extrude axially of the bearing as indicated at 168 in FIG. 6.

Obviously, instead of providing a rotatable indexable table such as illustrated at 102, the support structure may include a table oscillatable or reciprocable between two positions and carrying two rotatable rings such as 108 and the associated die structure. With this arrangement the support will position one of the die structures in working position and the other structure at one side or the other thereof where both loading and unloading may take place. This calls for duplication of the releasing lever 170 at the stations at either side of the working station.

The method as described in the foregoing has the material advantage of producing a bearing which is exactly round and precisely dimensioned on its outer and inner surfaces and its left hand end surface as seen in FIG. 3. This bearing may be finished by removing the material displaced from its right hand end as seen in FIG. 3, to produce the completely dimensioned bearing required.

The operation of producing the bearing by the foregoing described method has the advantage of providing rolled material precisely at the point of greatest wear; namely, the ball-receiving groove or channel 20.

I claim:

1. Apparatus for rolling an annular body into an internal bearing race comprising a rotary die having an annular groove-forming rib extending therearound and having a radial shoulder spaced from the rib, a sizing ring having an internal cylindrical surface of a diameter equal to the required outside diameter of the bearing race and having adjacent one side thereof a radially inwardly extending flange provided with a radial inner surface engageable with the aforesaid radial surface on the die, the portion of the die at the opposite side of the rib from the aforesaid shoulder being spaced from the adjacent internal cylindrical surface of the sizing ring to provide space for axial extrusion of material from the annular body after the body has been rolled to the required cross-sectional shape and increased in diameter to completely fill the sizing ring, means for effecting rotation of the die, the annular body, and the sizing ring in synchronism, and means for effecting relative approach between the die and sizing ring to decrease the thickness of the annular body, to increase its diameter, and finally to cause axial extrusion of excess material thereof after the annular body has been enlarged to completely fill the sizing ring.

2. Apparatus as defined in claim 1 which comprises means for driving the die in rotation, its engagement with the annular body and the engagement between the annular body and sizing ring causing synchronous rotation thereof.

3. Apparatus as defined in claim 2 which comprises a first roller engaging the outside surface of the sizing ring, and roller means supporting the die adjacent the location of the first roller.

4. Apparatus as defined in claim 3 comprising an additional roller engaging the outer surface of the sizing ring to guide it in rotation.

5. Apparatus as defined in claim 1 in which the sizing ring is formed of a plurality of sections separated along radial lines and a rotatable support ring for supporting the sections of the sizing ring with the edge surfaces in abutment while providing for withdrawal of the sizing ring sections from the support ring to provide for separation between the sizing ring sections and removal of a finished bearing therefrom.

6. Apparatus as defined in claim 5 comprising a conical surface in the support ring and cooperating conical surfaces on the sections of the sizing ring, the angle of these conical surfaces being such as to provide a locking action.

7. Apparatus as defined in claim 6 comprising resilient means acting between the sections of the sizing ring urging said sections apart.

8. Apparatus as defined in claim 7 comprising resilient means acting between the support ring and the sizing ring sections urging the conical portions of the sizing ring sections into cammed engagement with the conical surface of the support ring to force the sizing ring sections together.

9. Apparatus as defined in claim 8 comprising a movable support including a plurality of rotatable support and sizing rings, a working station, a rolling die at the working station, a loading and unloading station, and release means at the loading and unloading station operable to displace the sizing ring sections from the support ring to provide for separation therebetween.

10. The method of producing an annular internally grooved bearing race which comprises applying a rolling action to the interior surface of the body progressively around the body while supporting the body adjacent the point of application of the rolling action, thereby decreasing the radial thickness of the body, shaping its interior surface to a required groove configuration, and simultaneously increasing its circumference, confining the body to a predetermined outside diameter, and after it has reached the predetermined outside diameter extruding the material of the body axially from one side thereof.

11. The method as defined in claim 10 which comprises supporting the opposite side of the body during extrusion of excess material axially from the aforesaid one side thereof.

References Cited

UNITED STATES PATENTS 2,223,799   12/1940   Annen _____ 29—148.4 X
3,230,606   1/1966   Saito et al. _____ 29—148.4

THOMAS H. EAGER, Primary Examiner

U.S. Cl. X.R.

29—200 B; 75—208